(12) United States Patent
Gonen et al.

(10) Patent No.: US 7,884,844 B2
(45) Date of Patent: Feb. 8, 2011

(54) SYSTEM FOR CONDUCTING VIDEOCONFERENCING SESSION OVER TELEVISION NETWORK

(75) Inventors: Edward Gonen, Yoqneam Illit (IL); Shai Toren, Tivon (IL); Boris Rakhlin, Haifa (IL)

(73) Assignee: Polycom, Inc., Pleasanton, CA (US)

( * ) Notice: Subject to any disclaimer, the term of this patent is extended or adjusted under 35 U.S.C. 154(b) by 1332 days.

(21) Appl. No.: 11/308,294

(22) Filed: Mar. 15, 2006

(65) Prior Publication Data

US 2007/0216759 A1    Sep. 20, 2007

(51) Int. Cl.
*H04M 11/04* (2006.01)
(52) U.S. Cl. .............. 348/14.08; 348/14.12; 348/14.13; 370/260
(58) Field of Classification Search ... 348/14.01–14.16; 370/260–261; 709/204; 725/111, 33, 32
See application file for complete search history.

(56) References Cited

U.S. PATENT DOCUMENTS

| 6,339,842 | B1* | 1/2002 | Fernandez et al. .......... 725/133 |
| 6,452,923 | B1 | 9/2002 | Gerszberg et al. ........... 370/352 |
| 6,889,385 | B1 | 5/2005 | Rakib et al. ................. 725/119 |
| 7,325,033 | B2* | 1/2008 | Thornton .................... 709/204 |
| 2005/0091380 | A1 | 4/2005 | Gonen et al. ................ 709/227 |
| 2006/0020993 | A1* | 1/2006 | Hannum et al. ............. 725/111 |

* cited by examiner

*Primary Examiner*—Melur Ramakrishnaiah
(74) *Attorney, Agent, or Firm*—Wong, Cabello, Lutsch, Rutherford & Brucculeri LLP

(57) ABSTRACT

A videoconferencing system includes a camera, a microphone, and an interface module. The module is coupled a modem connected to a television network and is coupled to a television set and a set-top box. The module decodes encoded audio video signals received from the modem that are part of a videoconferencing session. The module also encodes audio and video signals received from the camera and the microphone and sends the encoded audio video signals to the modem to be part of the videoconferencing session. The module can selectively send decoded audio signals to the television set or can selectively send video received from the set-top box to the television display. In addition, the module can send compressed audio and video signals received from the microphone and camera to the set-top box for processing and delivery to the television display.

21 Claims, 2 Drawing Sheets

SYSTEM FOR CONDUCTING VIDEOCONFERENCING SESSION OVER TELEVISION NETWORK

FIELD OF THE DISCLOSURE

The subject matter of the present disclosure relates to a system for conducting a videoconferencing session over a television network.

BACKGROUND OF THE DISCLOSURE

Videoconferencing allows participants to share audio and video during a videoconference session. To conduct the session, the participants must have multimedia endpoints, which are typically associated with computers and are connected to a wideband network. Operating such multimedia endpoints and establishing the videoconferencing session requires that the participants have a certain amount of knowledge on how to set up the endpoints, connect the endpoints, etc. Consequently, videoconferencing sessions are popular in business environments where participants typically have more expertise, but videoconferencing sessions have not been popular between private households.

Advances in digital broadcasting enable television providers to offer interactive services, such as video-on-demand, to subscribers. Conventional interactive television systems, however, are limited to unidirectional video communication and/or audio telephony, and do not support video telephony. For example, some television systems enable television subscribers to access and view World Wide Web pages on their televisions in addition to receiving television channels. Although access to the web is possible, other "computer-like" functions are not currently available to television subscribers.

SUMMARY OF THE DISCLOSURE

In one embodiment, a videoconferencing system includes a camera, a microphone, and an interface module. The interface module is coupled a modem connected to a television network and is coupled to a television display and a set-top box. The interface module decodes encoded audio and video signals received from the modem that are part of a videoconferencing session. The interface module also encodes audio and video signals received from the camera and the microphone and sends the encoded audio video signals to the modem to be part of the videoconferencing session. The interface module can selectively send decoded audio signals to the television display or can selectively send video received from the set-top box to the television display. In addition, the interface module can send compressed audio and video signals received from the microphone and camera to the set-top box for processing and delivery to the television display.

In one embodiment, the camera can be a compression video camera, such as a VIAVIDEO II™ camera from POLYCOM™, and the camera captures and compresses video for a videoconferencing session. Circuitry associated with the microphone performs audio compression and decompression so that acoustic echo cancellation can be performed. The compressed audio and video signals are transmitted to the interface module, which encodes them and sends them over the television network via the modem as part of the videoconferencing session. Encoded audio and video received over the television network via the modem are received by the interface module as part of the videoconferencing session. These received audio and video signals can be delivered to the television after processing and decoding by the television set-top box or by the interface module.

The disclosed videoconferencing system allows a user to conduct bidirectional communication as part of a videoconferencing session using the network. Using the disclosed videoconferencing system, for example, a television subscriber can conduct videoconferencing sessions with other users and can exchange video and/or audio with other users equipped with similar devices. The subscriber can establish the videoconferencing sessions ad-hoc between two or more other users by selectively controlling the system.

The foregoing summary is not intended to summarize or limit each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
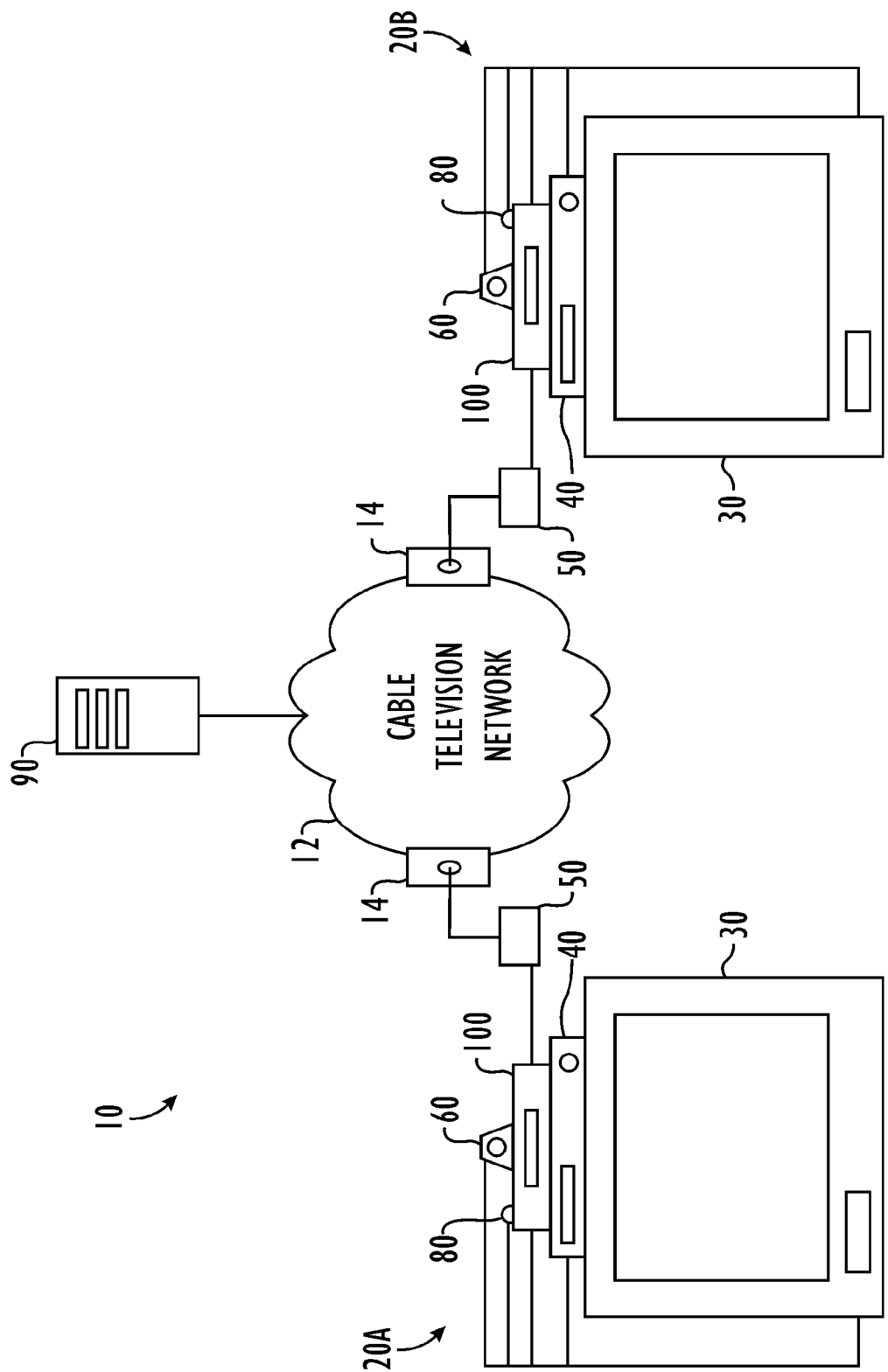
FIG. 1 illustrates an embodiment of a videoconferencing setup for a television network according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, a videoconferencing setup 10 for a television network 12 is illustrated. In one embodiment, the television network is a digital cable television network. The videoconferencing setup 10 is shown having two videoconferencing systems 20A and 20B for illustrative purposes. Each videoconferencing system 20A and 20B includes a camera 60, a microphone 80, and a television interface module 100. The interface module 100 is coupled to the camera 60 and the microphone 80 using conventional connections, such as Universal Serial Bus and audio-in, for example. Alternatively, the camera 60 and microphone 80 can be integral components of the interface module 100.

The interface module 100 couples a television (TV) set 30 to the digital television network 12 for conducting videoconferences. The interface module 100 allows the digital television network 12 to be used as a bidirectional network to carry bi-directional Internet Protocol (IP) based communications during a videoconferencing session, for example. To connect with the network 12, the interface module 100 is connected to a television socket 14 of the network 12 via a television Internet modem 50, and the interface module 100 is connected to the input of the TV set 30 and/or to a set-top box 40 connected to the TV set 30. The set-top box 40 can be independently connected to the television network 12 and can be a conventional set-top box known in the art used for televisions.

The camera 60 is preferably capable of producing compressed video signals. Examples of compression cameras include, but are not limited to, a VIAVIDEO™ or VIAVIDEO II™ camera from POLYCOM™. Alternatively, the camera 60 can be a conventional webcam, in which case any compression can done by a processor associated with the camera 60 or in the interface module 100.

As will be explained in more detail below, the interface module 100 processes video signals from the camera 60 and audio signals from the microphone 80. Then, the interface module 100 transmits the processed audio and video signals to the television network 12 as part of a videoconferencing session. In addition, the interface module 100 receives audio and video from the television network 12 as part of a videoconferencing session. The interface module processes the audio and video and sends the processed audio and video as input to the TV set 30 or to the set-top box 40.

Figure 2:
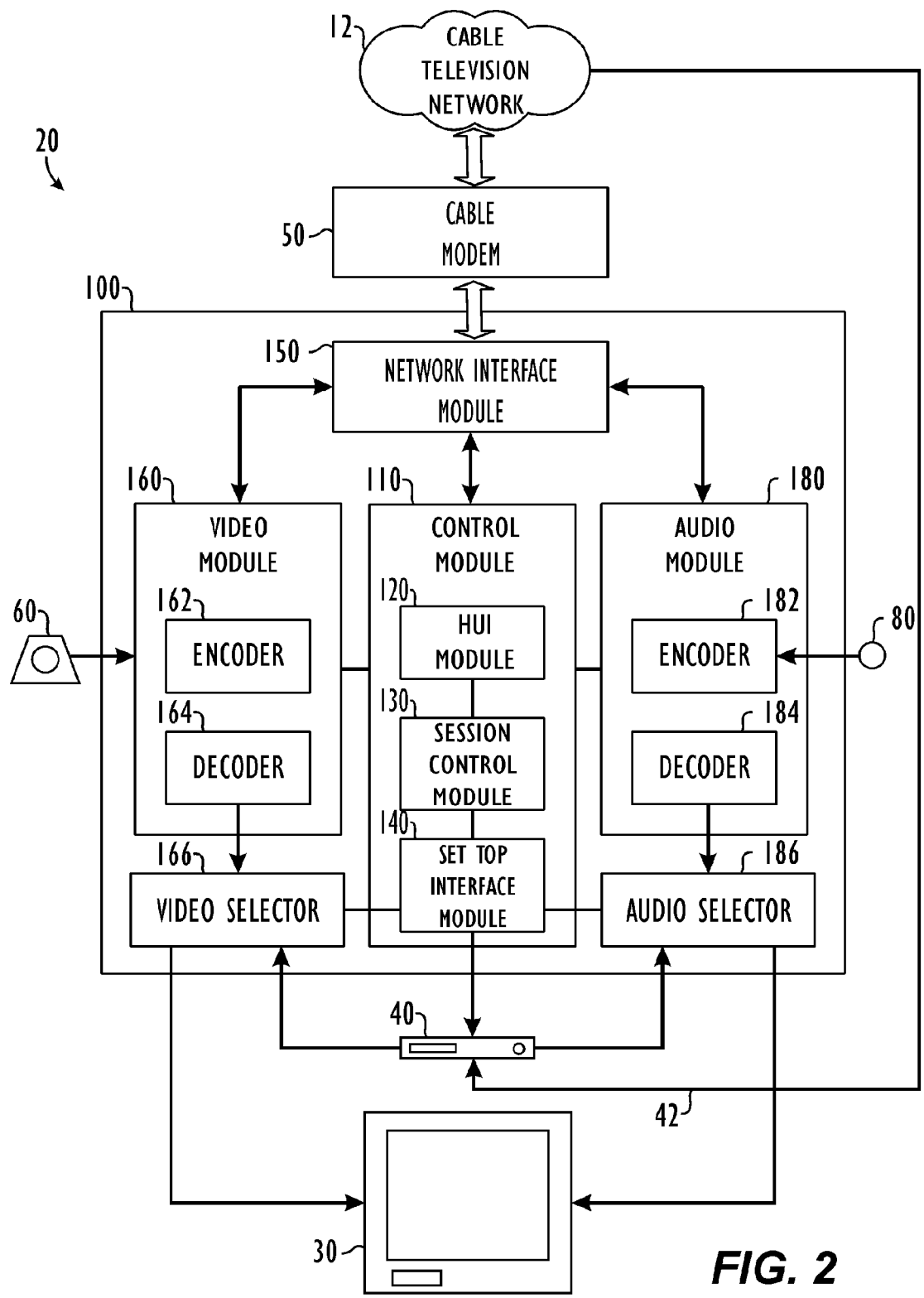
FIG. 2 schematically illustrates an embodiment of a television interface module for a videoconferencing system.

In one embodiment, the interface module 100 has a network interface, such as module 150 discussed below in FIG. 2, that connects to an intermediate server 90, such as a POLYCOM™ WEB OFFICE™ server. The intermediate server 90 is used to establish a videoconference session between videoconferencing systems 20A and 20B. An exemplary intermediate server is disclosed in U.S. Patent Application Publication 2005/0091380, which is incorporated herein by reference in its entirety. In an alternative embodiment, the interface module 100 has a network interface, such as module 150 discussed below in FIG. 2, that can establish a videoconference session between videoconferencing systems 20A and 20B based on a communication protocol, such as H.323, Session Initiation Protocol (SIP), or Internet Protocol (IP), without using such an intermediate server 90.

Given the overview of the videoconferencing setup 10 discussed above, we now turn to a more detailed discussion of a videoconferencing system 20. Referring to FIG. 2, a videoconferencing system 20 is schematically illustrated in more detail. The interface module 100 of the system 20 includes a control module 110, a network interface module 150, a video module 160, and an audio module 180. The network interface module 150 is communicatively coupled to the television network 12 via the modem 50. Thus, the network interface module 150 is configured for multimedia communication based on protocols including, but not limited to, H.323, SIP, or any other IP communication protocol. The multimedia communication handled by the network interface module 150 includes compressed video and compressed audio, as well as control and signaling communication for a videoconference. The set-top box 40 is coupled to the interface module 100 and can have an independent connection 42 to the television network 12.

To handle video, the video module 160 includes a video codec having an encoder 162 and decoder 164. The video module 160 receives compressed video from network interface module 150 and video signal from the camera 60. The video signal from the camera 60 can be open video (uncompressed video) or compressed video. The decoder 164 decodes compressed video. The decoded video can then be sent via a selector 166 directly to a video input of the TV set 30 for display when the selector 166 is in a first state as shown in FIG. 2. When the selector 166 is in a second state, however, video from the set-top box 40 can be routed to the TV set 30. This second state of the selector 166 may be used when the interface module 100 is not being used for videoconferencing and a user wants to view content from the television network on the TV set 30. Alternatively, this second state of the selector 166 may be used when the interface module 100 sends compressed video signals from the camera 60 to the set-top box 40 for processing, as discussed below.

In an embodiment of the system 20, the selector 166 can be a video mixer. As a video mixer, the selector 166 can receive decoded video from the set-top box 40 and from decoder 164. The selector 166 can then build a video frame that includes video coming from the set-top box 40 and video from the videoconference. By using the selector 166 in this manner as a video mixer, two or more people (i.e., "buddies") can see the same TV program while conducting the videoconference.

In an alternative embodiment, the video module 160 can send compressed video to the set-top box 40 on one of the available channels, and the set-top box 40 can then process the compressed video for delivery to the TV set 30. The delivery can be done through a direct connection between the set-top box 40 and the TV set 30, or the processed video can be routed from the box 40 to the TV set 30 via the video selector 166. In one embodiment, the video selector 166 can be embodied in a physical switch actuated by a user to select routing of video. In an alternative embodiment, the video selector 166 can be embodied in software of the interface module 100 controlled by user selections and commands from the control module 110, and specifically from its Human User Interface module 120.

The video module 162 also receives video from the camera 60 using conventional interfaces and inputs. Video compression is preferably performed by the camera 60 so that any bandwidth limitations that may be involved with communicating uncompressed video from the camera 60 to the interface module 100 can be avoided. The encoder 162 encodes the compressed video from the camera 60 and sends the encoded video to the television network 12 via network interface module 150 and the modem 50. This sent video can then be viewed as part of the videoconference session by a remote participant having another videoconferencing system. Yet in an alternate embodiment of the system 20, a compressed video signal from the camera 60 can be transmitted as is from the camera 60 to the network interface module 150.

To handle audio, the audio module 180 includes an audio codec having an encoder 182 and decoder 184. The audio module 180 receives compressed audio from network interface module 150 and the microphone 80, and the decoder 184 decodes encoded and compressed audio. The decoded audio can then be sent via a selector 186 to an audio input of the TV set 30 when the selector 186 is in a first state as shown in FIG. 2. When the selector 186 is in a second state, however, audio from the set-top box 40 can be routed to the TV set 30. This second state of the selector 186 may be used when the interface module 100 is not being used for videoconferencing and a user wants to hear content from the television network on the TV set 30. Alternatively, this second state of the selector 186 may be used when the interface module 100 sends compressed audio signals from the microphone 80 to the set-top box 40 for processing, as discussed below.

In another embodiment of the system 20, the selector 186 can be an audio mixer. As an audio mixer, the selector 186 can receive decoded audio from the set-top box 40 and from decoder 184. In this way, the selector 186 can mix the audio coming from the set-top box 40 with the audio of the videoconference.

In an alternative embodiment, the audio module 180 can send compressed audio to the set-top box 40 on one of its available channels, and the set-top box 40 can process the compressed audio for delivery to the TV set 30. The delivery can be done through a direct connection between the set-top box 40 and the TV set 30 or can be routed from the set-top box 40 to the TV set 30 via the video selector 186. In one embodiment, the audio selector 186 can be embodied in a physical switch actuated by a user to select routing of video, and the audio selector 186 can be combined with the video selector 186. In an alternative embodiment, the audio selector 166 can be embodied in software of the interface module 100 controlled by user selections and commands from the control module 110, and specifically from its Human User Interface module 120.

The audio module 182 also receives audio from the microphone 80 using conventional interfaces and inputs. Audio compression and decompression can be performed by circuitry associated with the microphone 80, thus allowing acoustic echo cancellation to be performed on captured audio. The encoder 182 encodes the compressed audio and transfers the encoded audio to the television network 12 via network interface module 150 and the modem 50. This transferred audio can then form part of a videoconferencing session with other videoconferencing systems.

The control module 110 includes a human user interface (HUI) module 120, a session control module 130, and a set-top interface module 140. The session control module 130 is configured to establish a videoconferencing session and to control the network interface module 150, video module 160, and audio module 180. The set-top interface module 140 is responsible for interfacing with the set-top box 40. In one embodiment, the set-top interface module 140 controls the audio/video selectors 166 and 186 to select whether audio/video is delivered from the video and audio modules 160 and 180 directly to the TV set 30 or whether audio/video is delivered from the set-top box 40 to the TV set 30. In an alternate embodiment where the selectors 166/186 are video/audio mixers (respectively), then the control module 110 can define which source of data or whether the data combined (e.g., mixed) from both sources will be delivered to the TV set 30.

The human user interface module 120 receives commands or user selections from a control device (not shown), such as a control panel, a remote control, or the like. For example, the control device can be a dedicated remote control for controlling the interface module 100. The commands or user selections are used to setup and initiate videoconference sessions. For example, a user at one videoconferencing system (e.g., system 20A of FIG. 1) can initiate a videoconference session by entering an address, e.g., Internet Protocol or Session Initiation Protocol address, for another videoconferencing system (e.g., system 20B of FIG. 1) using a remote control and a menu of the user interface module 120. In turn, the session control module 130 sends a request to the second videoconferencing system. Upon receiving the request for the incoming videoconference session via the television network 12, the user interface module 120 is configured to process the request and initiate an input call task. The input call task announces the entering of a videoconference call to the user and requests the user to accept or deny the call. The user then uses the control device (e.g., remote control) to communicate user selections to the user interface module 120, which interprets the user selections so that the session control module 130 can control operation of the user interface module 100 and establish the videoconference session.

Optionally or additionally, an exemplary interface module 100 can be adapted to set a connection with the intermediate server 90 for registration at the server 90 as an active endpoint. The registration can be done automatically upon power on and/or by a received request/command from the user. In response, the server 90 can send a relevant "buddy list" to the interface module 100 to be displayed on the TV set 30. For example, displaying the "buddy list" can be done upon receiving a request from the user to see the list. In parallel, the server 90 can update the relevant one or more "buddy lists" at devices of other users that are currently active and that have been defined as the "buddies" of the registered user. The user can select one or more buddies from "buddy list" to participate in a conference.

In an alternate embodiment, the "buddy list" can include the entire address book of the registered user, independently whether those users in the list are active or not. Yet in another embodiment, the "buddy list" can have a field for indicating that the relevant user's interface module 100 is active. Additional techniques for establishing a videoconference can be found in the U.S. Patent Application Publication 2005/0091380, which is incorporated herein by reference in its entirety.

For example, if the user selects to enter the videoconference session, the control module 110 controls the video and audio modules 160 and 180 to process encoded video and audio of the videoconference session received from the network interface module 150. In addition, the control module 110 controls the audio and video selectors 166 and 188 to send decoded video selectively from the modules 160 and 180 to the TV set 30. Alternatively, the control module 110 can control the interface module 100 to send compressed audio and video signals to the set-top box 40 for processing and can set the selectors 166 and 180 to send video selectively from the set-top box 40 to the TV set 30.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing system, comprising:
    a camera transmitting video signals;
    a microphone transmitting audio signals; and
    a controller coupled to the camera, the microphone, a television set, a set-top box, and a modem, the modem connected to a television network, the set-top box connected to the television network, the controller configured to:
        receive video signals from the modem and from the set-top box;
        decode the video signals received from the modem,
        selectively send uncompressed video signals to the television set with a video selector, the uncompressed video signals including the video signals received at the modem in a first selected mode, at the set-top box in a second selected mode, and at both the modem and the set-top box in a third selected mode,
        send compressed video signals to the modem, the compressed video signals including video signals received from the camera,
        decode encoded audio signals received from the modem,
        selectively send uncompressed audio signals to the television set,
        encode audio signals received from the microphone, and send encoded audio signals to the modem.

2. The system of claim 1, wherein the television network comprises a cable television network.

3. The system of claim 1, wherein the video signals received from the camera comprise compressed or uncompressed video signals from the camera.

4. The system of claim 1, wherein the controller comprises a control module controlling operation of the video selector to selectively send the uncompressed video signals including the video signals received at the modem, at the set-top box, and at both the modem and the set-top box to the television set.

5. The system of claim 1, wherein to selectively send uncompressed audio signals to the television set, the controller is configured to:
receive audio signals from the modem and from the set-top box; and
selectively send the uncompressed audio signals including the audio signal received at the modem in the first selected mode, at the set-top box in the second selected mode, and at both the modem and the set-top box in the third selected mode to the television set.

6. The system of claim 5, wherein the system comprises an audio selector, and wherein the controller comprises a control module controlling operation of the audio selector to selectively send the uncompressed audio signals including the audio signals received at the modem, at the set-top box, and at both the modem and the set-top box to the television set.

7. The system of claim 1, wherein the controller comprise a video module having a decoder to decode encoded video signals received from the modem and having an encoder to encode video signals received from the camera.

8. The system of claim 7, wherein the controller comprise an audio module having a decoder to decode encoded audio signals received from the modem and having an encoder to encode audio signals received from the microphone.

9. The system of claim 1, wherein the controller comprises a network interface module coupled to the modem, the network interface module establishing a videoconference session using H.323 protocol, Session Initiation Protocol, Internet Protocol, or an intermediate server.

10. The system of claim 9, wherein the network interface module establishes a videoconference session with another videoconferencing device using the intermediate server.

11. The system of claim 1, wherein the camera comprises circuitry for compressing video, whereby the circuitry transmits compressed video signals to the controller.

12. The system of claim 11, wherein the controller sends compressed video signals to the set-top box via a channel available on the set-top box for processing and delivery to the television set.

13. The system of claim 1, wherein the microphone comprises circuitry for compressing audio, whereby the circuitry transmits compressed audio signals to the controller.

14. A videoconferencing system, comprising:
a modem connected to a television network;
a camera transmitting video signals;
a microphone transmitting audio signals; and
an interface module coupled to a television set and a set-top box, the interface module comprising:
a video input coupled to the camera to receive video signals;
an audio input coupled to the microphone to receive audio signals;
a network interface module coupled to the modem to conduct a videoconference session;
a video module coupled to the network interface module, the video module having a video decoder for decoding encoded video signals received from the modem as part of the videoconference session and having a video encoder for encoding video signals received from the camera, the network interface sending encoded video signals to the modem as part of the videoconference session;
an audio module coupled to the network interface module, the audio module having an audio decoder decoding encoded audio signals received from the modem as part of the videoconference session and having an audio encoder encoding audio signals received from the microphone, the network interface sending encoded audio signals to the modem as part of the videoconference session; and
a control module selectively controlling a video selector to send uncompressed video signals to the television set, the uncompressed video signals including the video signals received at the modem in a first selected mode, at the set-top box in a second selected mode, and at both the modem and the set-top box in a third selected mode, the control module selectively controlling an audio selector to send uncompressed audio signals to the television set, the uncompressed audio signals including the audio signals received at the modem in the first selected mode, at the set-top box in the second selected mode, and at both the modem and the set-top box in the third selected mode.

15. The system of claim 14, wherein the television network comprises a cable television network.

16. The system of claim 14, wherein the camera comprises circuitry for compressing video, whereby the circuitry transmits compressed video signals to the interface module.

17. The system of claim 16, wherein the interface module sends compressed video and compressed audio to the set-top box via a channel available on the set-top box for processing and delivery to the television set.

18. The system of claim 14, wherein the microphone comprises circuitry for compressing audio, whereby the circuitry transmits compressed audio signals to the interface module.

19. The system of claim 14, wherein the network interface module establishes a videoconference session with another videoconferencing system using H.323 protocol, Session Initiation Protocol, or Internet Protocol.

20. The system of claim 14, wherein the network interface module establishes a videoconference session with another videoconferencing system using an intermediate server.

21. The system of claim 14, wherein the control module comprises a user interface module receiving user selections used to control the video selector and the audio selector.

* * * * *